United States Patent [19]
Fletcher et al.

[11] Patent Number: 5,903,965
[45] Date of Patent: May 18, 1999

[54] METHOD FOR APPLYING A LOW FRICTION COATING ON A SPLINNED SLIP JOINT

[75] Inventors: Steven L. Fletcher; Thomas J. Keller, both of Bristol, Va.

[73] Assignee: Dana Corporation, Toledo, Ohio

[21] Appl. No.: 08/923,576

[22] Filed: Sep. 4, 1997

[51] Int. Cl.$^6$ ..................................................... B23P 25/00
[52] U.S. Cl. ............................ 29/458; 427/277; 264/134; 264/242
[58] Field of Search ............................... 29/458; 403/359; 427/271, 277; 264/134, 242

[56] References Cited

U.S. PATENT DOCUMENTS

| | | |
|---|---|---|
| 3,367,142 | 2/1968 | Groves et al. . |
| 4,033,020 | 7/1977 | Hudgens ................................. 29/149.5 |
| 4,552,544 | 11/1985 | Beckman et al. ........................ 464/162 |
| 5,042,153 | 8/1991 | Imao et al. ............................. 29/898.12 |
| 5,114,521 | 5/1992 | Isegawa et al. .......................... 156/242 |
| 5,720,102 | 2/1998 | McClanahan ......................... 29/898.12 |

*Primary Examiner*—P. W. Echols
*Assistant Examiner*—John C. Hong
*Attorney, Agent, or Firm*—MacMillan, Sobanski & Todd, LLC

[57] ABSTRACT

A method for applying a low friction coating to the cooperating splines of a slip joint that results in precise conformance between the intermeshing splines of the telescoping members includes the initial steps of cleaning, priming, and coating the splines of a tube shaft with a low friction material. Then, the coating on the splines is shaped to precisely conform to internal splines provided on a slip yoke of the slip joint. To accomplish this, an annular die is provided having a generally hollow and cylindrical shape, but tapering from a relatively large diameter upper end to a relatively small lower end. Thus, an inner frusto-conical surface is defined through the center of the die. A plurality of tapered splines is formed on the inner frusto-conical surface of the die that are generally shaped in a complementary fashion to the splines formed on the tube shaft. The die may be provided with a device for heating the die to a desired temperature. The splined end of the tube shaft is then lowered into the die such that the internal splines of the die engage the external splines of the tube shaft. Because the die is heated to a temperature above the melting point of the low friction material coating, the coating on the splines melts and conforms to the profile of the splines of the die. The movement of the tube shaft is continued such that the splines pass completely through the die and are then received in splined end of the slip yoke, which is also aligned with the tube shaft and the die. The tube shaft is then allowed to remain in the slip yoke for a period of time sufficient to allow the coating on the splines to cool and harden in precise conformance with the splines of the slip yoke. Lastly, the tube shaft is retracted from the slip yoke and the die. Alternatively, the die may be raised over the tube shaft, leaving the tube shaft inserted within the slip yoke for shipment and installation.

18 Claims, 4 Drawing Sheets

METHOD FOR APPLYING A LOW FRICTION COATING ON A SPLINNED SLIP JOINT

BACKGROUND OF THE INVENTION

This invention relates in general to the manufacture of slip joints, such as are commonly used in vehicle drive train systems, for transmitting rotational force or torque between telescoping members. In particular, this invention relates to an improved method for applying a low friction coating to the cooperating splines of such a slip joint that results in precise conformance between the intermeshing splines of the telescoping members.

In most land vehicles in use today, a drive train system is provided for transmitting rotational power from an engine/transmission assembly to an axle assembly so as to rotatably drive one or more wheels of the vehicle. To accomplish this, a drive shaft assembly is usually connected between an output shaft of the engine/transmission assembly and an input shaft of the axle assembly. To accomplish this, a first universal joint is connected between the output shaft of the engine/transmission assembly and a first end of the drive shaft assembly, while a second universal joint is connected between a second end of the drive shaft assembly and the input shaft of the axle assembly. The universal joints provide a rotational driving connection from the output shaft of the engine/transmission assembly through the drive shaft assembly to the input shaft of the axle assembly, while accommodating a limited amount of angular misalignment between the rotational axes thereof.

Not only must the drive train system accommodate a limited amount of angular misalignment between the engine/transmission assembly and the axle assembly, but it must also typically accommodate a limited amount of relative axial movement. A small amount of such relative axial movement frequently occurs when the vehicle is operated. To address this, it is known to provide one or more slip joints in the drive shaft assembly of the drive train system. A typical slip joint includes first and second splined members that are respectively connected to the output shaft of the engine/transmission assembly and to the input shaft of the axle assembly. The splined members provide a rotational driving connection between the components of the drive train system, while permitting a limited amount of axial misalignment therebetween.

As is well known in the art, one or both of the splined members may be coated with a material having a relatively low coefficient of friction. The low friction coating is provided to minimize the amount of force required to effect relative movement between the two splined members. Also, the low friction coating provides a relatively tight fit between the cooperating splines of the two splined members, thus minimizing any undesirable looseness therebetween while continuing to allow free axial movement.

A number of methods are known for applying the low friction coating to the splined members of the slip joint. In one known method, the splined region of the slip joint member is first primed, then dipped into a molten bath of the low friction coating. In another known method, the splined region of the slip joint member is initially heated, then immersed in a bed containing a quantity of the low friction coating in particulate form. Alternatively, the splines can be coated electrostatically, wherein the low friction coating is applied in a particulate form. It is also known to apply the low friction coating by injection molding the low friction material between the assembled splined members.

One problem that has been experienced in connection with slip joints manufactured according to known methods is that an undesirably large gap can still exist between adjacent splines formed on the cooperating members of the slip joint even after the coating has been applied. These relatively large gaps can occur as a result of manufacturing tolerances in the formation of the individual splined members and the coating process and usually result in an undesirable amount of looseness between the splined members during operation. Looseness that occurs in the direction of rotation of the splined members, wherein one of the splined members can rotate relative to the other splined member, is referred to as backlash. Looseness that occurs in the direction transverse to the axis of rotation of the slip joint, wherein one of the splined member can extend at a cantilevered angle relative to the other splined member, is referred to as broken back. Known solutions to the problems of backlash and broken back have been found to be relatively difficult, costly, and time consuming to employ. Thus, it would be desirable to provide an improved method for applying a low friction coating to the cooperating splines of a slip joint that results in precise conformance between the intermeshing splines of the telescoping members, thus, minimizing the adverse effects of backlash and broken back.

SUMMARY OF THE INVENTION

This invention relates to a method for applying a low friction coating to the cooperating splines of a slip joint that results in precise conformance between the intermeshing splines of the telescoping members. Initially, a splined end portion of a tube shaft of the slip joint is cleaned, primed, and coated with a low friction material. Then, the coating on the splines is shaped to precisely conform to internal splines provided on a slip yoke of the slip joint. To accomplish this, an annular die is provided having a generally hollow and cylindrical shape, but tapering from a relatively large diameter upper end to a relatively small lower end. Thus, an inner frusto-conical surface is defined through the center of the die. A plurality of tapered splines is formed on the inner frusto-conical surface of the die that are generally shaped in a complementary fashion to the splines formed on the tube shaft. The die may be provided with a device for heating the die to a desired temperature. The splined end of the tube shaft is then lowered into the die such that the internal splines of the die engage the external splines of the tube shaft. Because the die is heated to a temperature above the melting point of the low friction material coating, the coating on the splines melts and conforms to the profile of the splines of the die. The movement of the tube shaft is continued such that the splines pass completely through the die and are then received in splined end of the slip yoke, which is also aligned with the tube shaft and the die. The tube shaft is then allowed to remain in the slip yoke for a period of time sufficient to allow the coating on the splines to cool and harden in precise conformance with the splines of the slip yoke. Lastly, the tube shaft is retracted from the slip yoke and the die. Alternatively, the die may be raised over the tube shaft, leaving the tube shaft inserted within the slip yoke for shipment and installation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
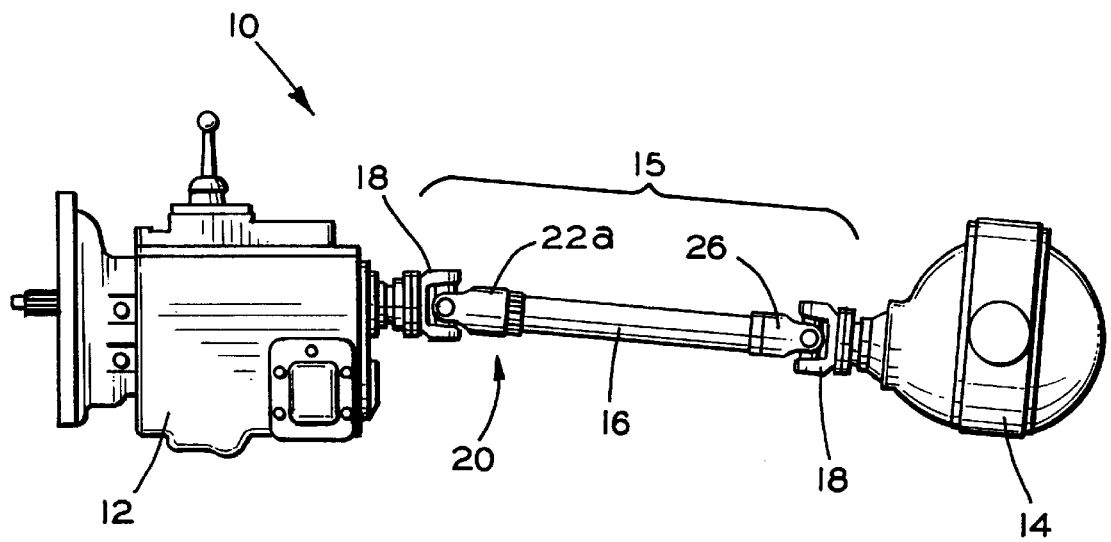
FIG. 1 is a side elevational view schematically illustrated a vehicle drive train system including a slip joint manufactured in accordance with the method of this invention.

Referring now to the drawings, there is illustrated in FIG. 1 a vehicle drive train system, indicated generally at 10, in accordance with this invention. The illustrated drive train system 10, which is intended to be representative of any drive train system, vehicular or otherwise, includes a transmission 12 having an output shaft (not shown) that is connected to an input shaft (not shown) of an axle assembly 14 by a drive shaft assembly 15. The transmission 12 and the axle assembly 14 are conventional in the art. The drive shaft assembly 15 includes a hollow cylindrical drive shaft tube 16 extending from a front end adjacent to the transmission 12 to a rear end adjacent to the axle assembly 14. The drive shaft assembly further includes a pair of universal joints 18 for rotatably connecting the transmission output shaft to the front end of the drive shaft assembly and for rotatably connecting the rear end of the drive shaft assembly to the axle input shaft. The universal joints 18 are also conventional in the art.

Figure 2:
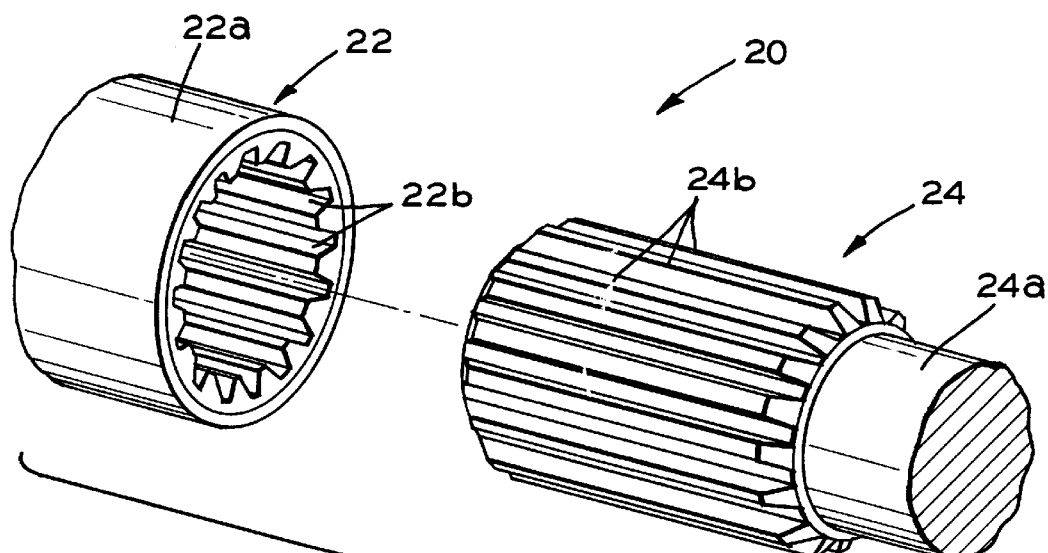
FIG. 2 is an enlarged perspective view of the slip joint of the vehicle drive train system illustrated in FIG. 1.

A slip joint, indicated generally at 20, is provided for connecting the front end of the drive shaft tube 15 to the front universal joint 18. The structure of the slip joint 20 is illustrated in detail in FIG. 2. As shown therein, the slip joint 20 includes a slip yoke, indicated generally at 22, including a hollow cylindrical body portion 22a having a plurality of splines 22b formed on an inner circumferential surface thereof. The slip yoke 22 has a pair of spaced apart arms (not shown in FIG. 2) extending from the body portion 22a that are connected to the front universal joint 18. The slip joint 20 also includes a tube shaft, indicated generally at 24, including a cylindrical body portion 24a having a plurality of splines 24b formed on an outer circumferential surface thereof. The body portion 24a of the tube shaft 24 is secured to the forward end of the drive shaft tube 15 in a conventional manner, such as by welding. The is splined end of the tube shaft 24 is sized to fit telescopically within the splined end of the slip yoke 22 such that the respective splines cooperate in a known manner to form the slip joint 20. The telescoping nature of the slip joint assembly 20 facilitates the installation of the drive shaft assembly 15 within a vehicle, accommodates relative axial movement between the transmission 12 and the axle assembly 14 (such as might be caused by movement of the vehicle over rough terrain), and provides for some absorption of energy in a collision of the vehicle.

A tube yoke 26 is provided for connecting the rear end of the drive shaft tube 15 to the rear universal joint 18. The tube yoke 26 is conventional in the art and secured to the rearward end of the drive shaft tube 15 in a conventional manner, such as by welding. It will be appreciated that the slip joint 20 may alternatively be provided for connecting the rear end of the drive shaft tube 15 to the rear universal joint 18, and that the tube yoke may be provided for connecting the front end of the drive shaft tube 15 to the front universal joint 18. Similarly, a number of other splined components are commonly used in conventional drive shaft assemblies, and the scope of this invention is intended to cover such other splined components.

A coating of a low friction material is adhered to the external splines 24b of the tube shaft 24. The low friction coating can be composed of any conventional material which facilitates the sliding movement of the slip yoke 22 relative to the tube shaft 24. A preferred low friction material is Nylon II, which is available from various suppliers of nylon materials. Although the low friction coating will be described as being applied to the external splines 24b of the tube shaft 24, it will be appreciated that the low friction coating may alternatively be provided on the internal splines of the slip yoke 22, or may be provided on both the external splines 24b of the tube shaft 24 and the internal splines 22a of the slip yoke 22.

This invention relates to a method for applying the low friction coating to the external splines 24b of the tube shaft 24. The steps of this method are shown in sequence in FIGS. 3a through 3e. As will be explained below, the tube shaft 24 is moved through a series of stations at which various operations are performed. The movement of the tube shaft 24 at and between each of these stations may be accomplished by any conventional manipulating device, such as a gantry robot (not shown), that is capable of holding not only supporting the tube shaft 24, but also moving it linearly in both the horizontal and vertical directions and rotating throughout a 360° range of movement. Preferably, the manipulating device is capable of moving the tube shaft 24 at variable linear and rotational speeds.

Figures 3A, 3B:
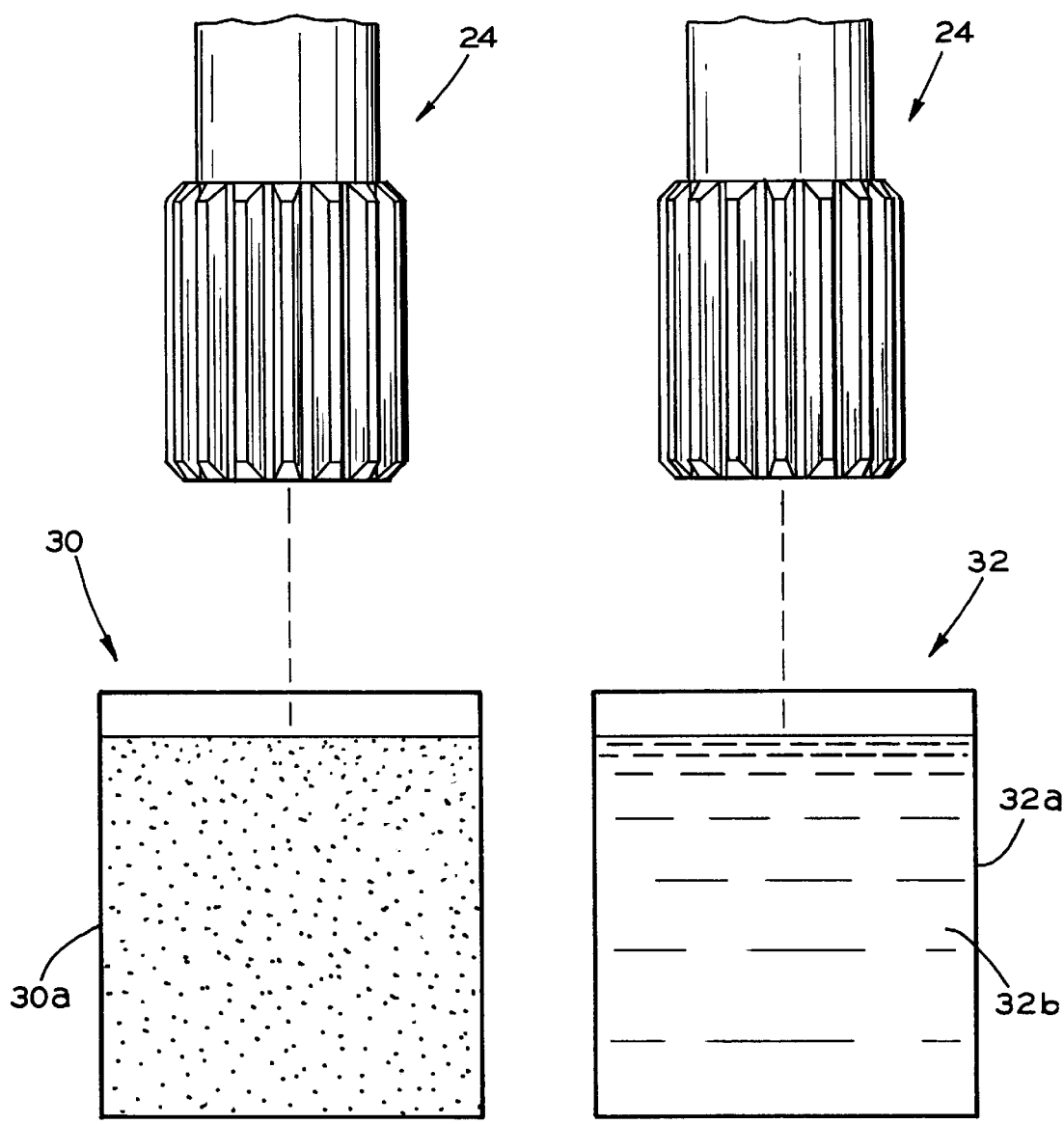
FIGS. 3A through 3D are schematic elevational views illustrating the steps in the method of applying a low friction coating to one of the splined members of the slip joint illustrated in FIG. 2.

In a first step shown in FIG. 3A, the tube shaft 24 is moved to a first station, indicated generally at 30, wherein the tube shaft 24 is subjected to an initial cleaning operation. This cleaning operation is usually performed on at least the splines 24b of the tube shaft 24 by mechanical abrasion within a tank 30a. To accomplish this, the tube shaft 24 is lowered within the tank 30a, then rotated by the manipulating device while being grit blasted by any conventional structure. The grit blasting process involves blowing or otherwise forcing a suitable particulate material, such as sand or crushed rock, against the splines of the tube shaft 24 so as to remove any undesired contaminants therefrom.

Next, as shown in FIG. 3B, the tube shaft 24 is advanced to a second station 32, wherein the cleaned splines and other surfaces of the tube shaft 24 are coated with a priming material. At this second station 32, the tube shaft 24 is lowered into a tank 32a containing a primer 32b by the manipulating device. In this manner, the primer 32b is applied to at least the external splines 24b of the tube shaft 24. The tube shaft 24 may be rotated and repeatedly dipped into and out of the tank 32a for variable time durations, depending upon the desired thickness of the primer 32b on the splines 24b of the tube shaft 24.

Figures 3C, 3D:
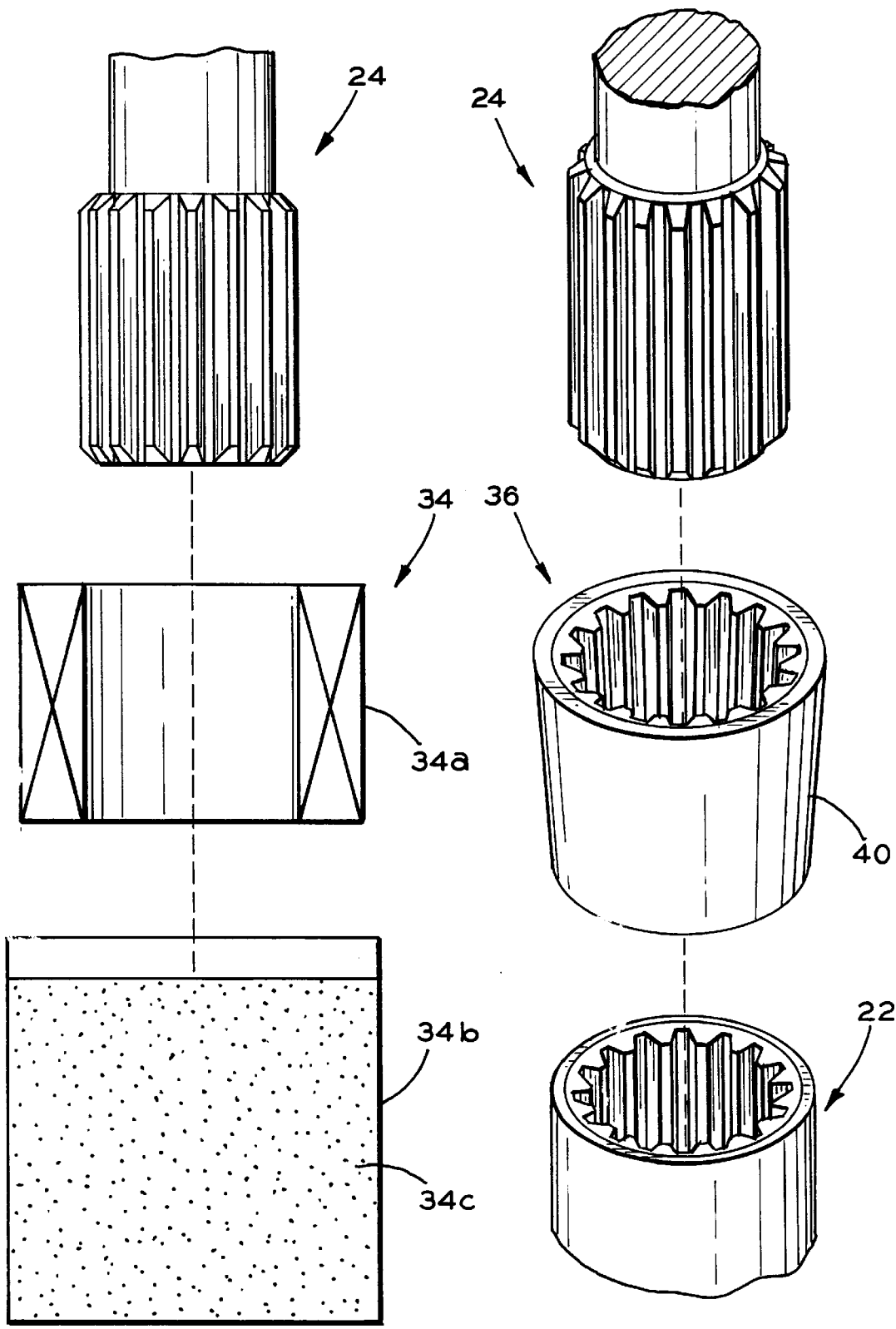

After the primer 32b has been applied, the tube shaft 24 is advanced to a third station 34 shown in FIG. 3C, wherein the coating of the low friction material is applied to the splines 24b of the tube shaft 24. This third station 34 includes a heating apparatus, such as an induction coil 34a, and a tank 34b containing a fluidized quantity 34c of the low friction material. The manipulating device initially lowers the tube shaft 24 through the induction coil 34a to be heated to a predetermined temperature. The induction coil 34a is conventional in the art and may be embodied as a hollow cylindrical structure having a helically wound electrical conductor provided therein. When the induction coil 34a is energized, the conductor generates an electromagnetic field that induces internal electrical currents within the tube shaft 24. These internal electrical currents in the tube shaft 24 cause the temperature of the tube shaft 24 to rise quickly to a desired temperature. Preferably, the tube shaft 24 is heated to a temperature that is approximately 10° F. to 100° F. above the melting temperature of the low friction material 34c contained within the tank 34b of the third station 34. For example, if nylon is used as the low friction material 34c, the tube shaft 24 can be heated to a temperature within the range of from about 500° F. to about 550° F. The temperature required for low friction coatings other than nylon may be different.

Once it has been heated to the desired temperature, the tube shaft 24 is then advanced into the tank 34b containing the quantity 34c of the low friction material. Preferably, the quantity 34c of the low friction material is provided in the form of a fine powder which is fluidized in the tank 34b by the flow of air or similar suitable gas. Alternatively, the quantity 34c of the low friction material may be provided in a coarser particulate form. In either event, because the tube shaft 24 has been heated to a temperature above the melting point of the low friction material, the portion of the low friction material that touches the tube shaft 24 when inserted within the tank 34b melts and adheres thereto. The time duration in which the tube shaft 24 is maintained within the tank 34b will vary with a number of factors, including the nature of the low friction material used and the thickness of the coating desired on the splines 24b of the tube shaft 24. Typically, however, this time duration will be approximately 10 seconds or less.

Once a generally uniform coating of sufficient thickness has been provided on the splines 24b, the tube shaft 24 is removed from the tank 34b by the manipulating device and allowed to cool for a period of time. During the initial portion of this cooling period, the low friction material coating remains melted, thereby providing a smooth outer surface thereof. This cooling period may include an initial air-cooling period followed by immersion of the coated portion of the tube shaft 24 in water or another suitable fluid. Preferably, the tube shaft 24 is cooled until the low friction material coating is firm (i.e. not subject to dripping or other movement as a result of gravity), but not completely solid. However, it may be desirable in some instances to allow the tube shaft 24 to reach ambient temperature before proceeding to the next step.

The method as described thus far may be modified in accordance with coating preparation and application processes known to those skilled in the art. For example, an oven (not shown) may be used in lieu of the induction coil 34a to initially heat the tube shaft 24. In a method where an induction coil 34a is used to heat the tube shaft 24, it may be possible to omit the priming step performed at the second station 32. This is because heating by the induction coil 34a tends to attract less dirt and other contaminants onto the tube shaft 24. Similarly, instead of dipping the tube shaft 24, the primer applied at the second station 32 and the low friction coating applied at the third station 34 may be applied by electrostatic spraying or any other suitable process.

Figure 4:
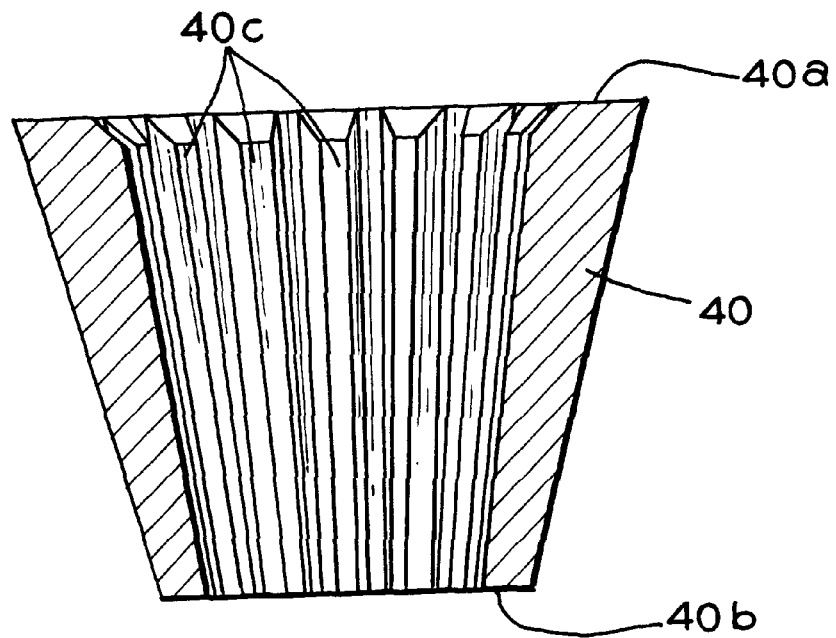
FIG. 4 is a sectional elevational view of the die illustrated in FIG. 3D.

Once the coating of the low friction material has been applied to the splines 24b of the tube shaft 24, the tube shaft 24 is advanced by the manipulating device to a fourth station 36 shown in FIG. 3D. At this fourth station 36, the coating on the splines 24b is shaped to precisely conform to the internal splines 22a provided on the slip yoke 22. To accomplish this, an annular die 40 is provided at the fourth station 36. The structure of the die 40 is illustrated more clearly in FIGS. 4 and 5. As shown therein, the die 40 is generally hollow and cylindrical in shape, but tapers from a relatively large diameter upper end 40a to a relatively small lower end 40b. Thus, an inner frusto-conical surface is defined through the center of the die 40. A plurality of splines 40c is formed on the inner frusto-conical surface of the die 40. The splines 40c are generally shaped in a complementary fashion to the splines 24b formed on the tube shaft 24. However, the splines 40c are tapered, as shown in FIG. 4, from the upper end 40a of the die 40 to the lower 40b thereof.

The size of the upper end 40a of the die 40 is somewhat larger than the size of the splines 24b formed on the tube shaft 24 so that the leading edge of the splines 24b of the tube shaft 24 do not touch the splines 40c of the die 40 until the tube shaft 24 is partially inserted within the die 40. Thus, the inner diameter of the upper end 40a of the die 40 need only be large enough such that the coating on the tube shaft 24 is not cut or otherwise damaged when the splines 24b are inserted into the die 40. The size of the lower end 40b of the die 40, however, is sized to define a shape that is substantially similar to the shape defined by the internal splines 22a formed on the slip yoke 22. The splines 40c on the die 40 may also be coated with a low friction material, such as nylon.

Figure 5:
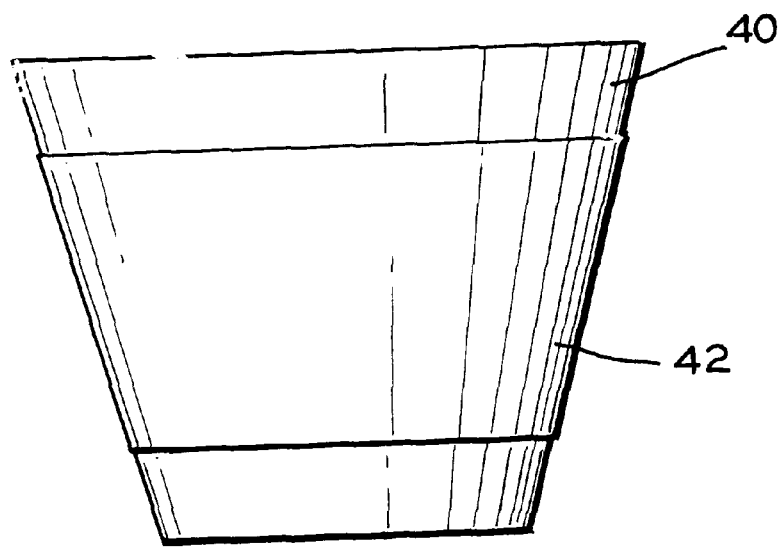
FIG. 5 is a side elevational view of the die illustrated in FIGS. 2 and 3D including a heater band.

As shown in FIG. 5, the die 40 may be provided with a device for heating the die 40 to a desired temperature. In the illustrated embodiment, the heating device is a band heater 42 wrapped or otherwise disposed about the outer circumference of die 40. The band heater 42 is conventional in the art and may, for example, be formed having one or more strands of electrical conductors that are connected to a source of electrical energy (not shown). When electrical current is passed through the band heater 42, the resistance of the electrical conductors generates heat. Preferably, the band heater 42 or other heating device is adapted to heat the die 40 such that the temperature of the internal splines 40c is approximately 10° F. to 100° F. above the melting temperature of the low friction coating on the splines 24b of the tube shaft 24.

In operation, the die 40 is heated until the surface temperature of the internal splines 40c is at the desired temperature. After the coated tube shaft 24 has been sufficiently cooled as described above, the manipulation device aligns the splines 24b of the tube shaft 24 above the die 40, as shown in FIG. 3D. The splined end of the tube shaft 24 is then lowered into the die 40 such that the internal splines 40c of the die 40 engage the external splines 24b of the tube shaft 24. Because the die 40 is heated to a temperature above the melting point of the low friction material coating, the coating on the splines 24b melts and conforms to the profile of the splines 40c of the die 40.

The movement of the tube shaft 24 is continued such that the splines 24b pass completely through the die 40 and are then received in the splined end of the slip yoke 22, which is also aligned with the tube shaft 24 and the die 40 as shown in FIG. 3D. Preferably, the tube shaft 24 is lowered into the slip yoke 22 while the low friction coating is still in a somewhat fluid state, allowing the coating to continue to flow into precise conformance with the splines 22a of the slip yoke 22. It has been found to be desirable to spray the slip yoke 22 with a release material (not shown) immediately or shortly before the tube shaft 22 is lowered therein. The tube shaft 22 is then allowed to remain in the slip yoke 22 for a period of time sufficient to allow the coating on the splines 24b to cool and harden in precise conformance with the splines 22a of the slip yoke 22.

In the final step of the process, the tube shaft 24 is retracted from the slip yoke 22 and the die 40, allowing removal of the tube shaft 24 and the slip yoke 22 from the manipulating device. Thereafter, the tube shaft 24 may be re-inserted within the slip yoke 22 for shipment and installation. As an optional final step in the process, the die 40 may be raised over the tube shaft 24, leaving the tube shaft 24 inserted within the slip yoke 22 for shipment and installation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for manufacturing a slip joint comprising the steps of:

(a) providing first and second slip joint members, wherein one of the slip joint members has an externally splined portion and the other of the slip joint members has an internally splined end portion;

(b) coating the splined portion of the first slip joint member with a low friction coating;

(c) providing a die having an internally splined region;

(d) aligning the die with the second slip joint member; and (e) inserting the coated splined portion of the first slip joint member through both the die and the second slip joint member so as to shape the low friction coating.

2. The method defined in claim 1 wherein the first slip joint member has the externally splined portion formed thereon.

3. The method defined in claim 1 wherein the first slip joint member is a tube shaft and the second slip joint member is a slip yoke.

4. The method defined in claim 1 further including the initial step of cleaning the splined portion of the first slip joint member prior to performing said step (b).

5. The method defined in claim 1 wherein further including the initial steps of cleaning the splined portion of the first slip joint member and applying a primer to the cleaned splined portion of the first slip joint member prior to performing said step (b).

6. The method defined in claim 1 wherein said step (b) is performed by heating the splined portion of the first slip joint member, then inserting the heated splined end of the first slip joint member into a tank containing a quantity of the low friction coating.

7. The method defined in claim 1 wherein said step (c) is performed by providing a die that is hollow and cylindrical in shape.

8. The method defined in claim 7 wherein the die has an inner frusto-conical surface, and the internally splined region is formed on the inner frusto-conical surface.

9. The method defined in claim 8 wherein the internally splined region includes a plurality of splines formed on the inner frusto-conical surface that are tapered from a first end of the die to a second end.

10. The method defined in claim 9 wherein the splines formed on the upper end of the die are larger than the splined portion of the first slip joint member such that the splined portion of the first member does not touch the splines of the die until the first slip joint member is partially inserted within the die.

11. The method defined in claim 10 wherein the splines formed on the lower end of the die are sized to define a shape that is substantially similar to the shape defined by the splined portion of the second slip joint member.

12. The method defined in claim 1 wherein the internally splined region of the die is coated with a low friction material.

13. The method defined in claim 1 wherein the die is provided with a device for heating the die to a desired temperature.

14. The method defined in claim 1 wherein said step (d) is performed by passing the splined portion of the first slip joint member completely through the die and then into the splined portion of the second slip joint member.

15. The method defined in claim 1 wherein a release material is applied to the coated splined portion of the first slip joint member prior to performing said step (d).

16. The method defined in claim 1 further including a step (f) of removing the first slip joint member from the second slip joint member and the die.

17. The method defined in claim 16 further including a step (f) of reinserting the first slip joint member into the second slip joint member.

18. The method defined in claim 1 further including a step (e) of removing the die 40 from the first slip joint member while maintaining the first slip joint member in the second slip joint member.

* * * * *